A. J. GRANBERG.

LIQUID METER.

APPLICATION FILED APR. 7, 1919.

Reissued Oct. 24, 1922. 15,476.

INVENTOR

A. J. Granberg.

BY

White & Prost his ATTORNEYS

Reissued Oct. 24, 1922. Re. 15,476

UNITED STATES PATENT OFFICE.

ALBERT J. GRANBERG, OF SAN FRANCISCO, CALIFORNIA, ASSIGNOR TO THE GRANBERG METER COMPANY, OF SAN FRANCISCO, CALIFORNIA, A CORPORATION OF CALIFORNIA.

LIQUID METER.

Original No. 1,282,412, dated October 22, 1918, Serial No. 207,809, filed December 19, 1917. Application for reissue filed April 7, 1919. Serial No. 288,388.

*To all whom it may concern:*

Be it known that I, ALBERT J. GRANBERG, a citizen of the United States, residing at San Francisco, in the county of San Francisco and State of California, have invented new and useful Improvements in Liquid Meters, of which the following is a specification.

The object of the present invention is to provide a simple, inexpensive, compact and accurate means for registering the magnitude of the flow of the flowing liquid, which is adapted for measuring the flow of liquids of all kinds.

In the accompanying drawing, Figure 1 is a plan view of a box-like casing of my improved liquid meter, the mechanism normally therein being removed;

Figure 1:
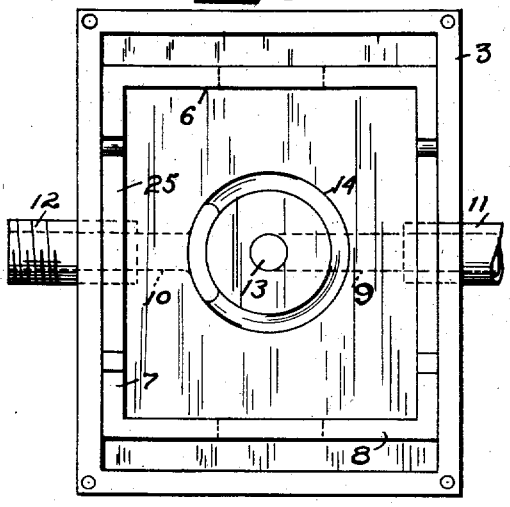
Figure 2:
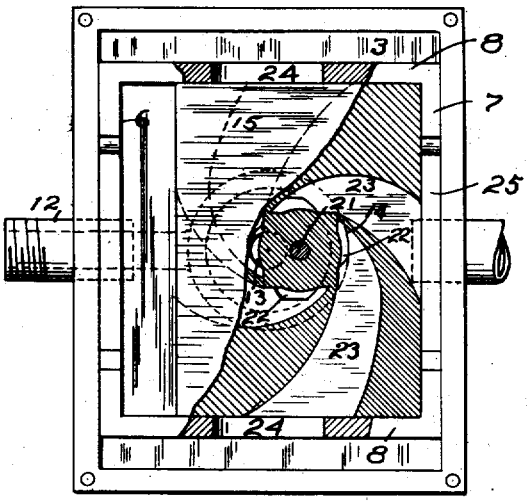
Fig. 2 is a broken plan view showing said parts partly in section.

Referring to the drawing, 1 indicates a base to which is bolted the lower portion 2 of a casting, the upper portion of which is in the form of a rectangular box 3, the top of which box is closed by a removable cover 4 bolted down thereon tight, and inclosing therewithin a rectangular hard rubber slide piece 6, which is shaped to slide within the casing. The particular slide piece shown in the drawings is rectangular in shape and consists of four walls, of which two, 7, are shown longer than the other two, 8, and fit closely against the long sides of the box 3, while the shorter walls 8 are spaced from the ends of the casting so that said slide piece can reciprocate to and from said ends. In the portion 2 of the casting, are conduits 9, 10, adapted to communicate respectively with an inlet pipe 11 and an outlet pipe 12. The conduit 9 discharges centrally, as shown in 13, in the bottom of the box-shaped portion of the casting, while the conduit 12 opens in the bottom of said box-shaped portion at a distance from the center, and communicates with a circular groove 14 formed in the bottom of said box-shaped portion.

Slidable in said box-shaped part 3 of the casting is a rectangular hard rubber meter head 15, which is of size as to form a sliding joint with the end walls of the slide piece 6. The width, however, of said meter-head is less than the width of the slide to enable it to slide transversely in the slide piece 6. The meter-head and slide piece both fit snugly between the bottom of the box 3 and the under surface of the cover 4. Centrally in the under side of the cover is a cylindrical recess 16 in which is fitted a disk 17, from the center of which a shaft 18 extends upwardly through a bearing 19 in the cover, a hard rubber bushing 20 being interposed between the shaft and its bearing.

From the disk depends eccentrically a pin 21 which passes through a central hole in the meter-head. It is evident that, if the meter-head is given a motion of revolution about the center of the disk, the shaft 18 will be rotated.

The meter-head is formed with four equally spaced conduits 22. Each conduit leads from the bottom of the meter-head first directly upward and then outward in a spiral direction, the spiral portions 23 of said conduits increasing in width outwardly and terminating in the middle of the sides of the meter-head. The length of the spiral is such that the conduit turns through a right angle from its beginning to its end. The inlet end of each conduit lies directly between the center of the meter-head and one of its straight sides and the conduit terminates in the middle of a side which is next adjacent to the aforesaid side. By reason of the eccentric relation of the pin 21 and the shaft 18, the meter-head will always be eccentric to said shaft 18, and the smaller end of one conduit 22 will always be in register with a portion of the groove 14, while the smaller end of the opposite conduit 22 will always be in register with the one-half of the hole 13 which is farthest from said portion of the groove 14. Supposing the parts to be in the position in which the entrance or narrow end of one of the conduits 22 is nearest a long side of the slide piece 6, then the liquid will flow through the inlet pipe 11 and inlet conduit 9 and hole 13 into the smaller end of one of said conduits 22 and will flow outward in said conduit 22 to the outer end thereof, then through a port 24 in one of the two shorter walls 8 of the slide piece, and will then flow into the corresponding end of the box 3. At the same time liquid can flow from the opposite end of the box through the corresponding port 24 in the adjacent wall 8 and into the larger end of the spiral portion 23 of the opposite conduit 22 and out through the smaller end thereof and into the groove 14 and so into the exhaust pipe 12. By the pressure of the liquid the slide piece is moved from the first-named end toward the second-named end.

The meter-head is also moved with the slide frame in a longitudinal direction, and by reason of the fact that this motion is controlled by the pin 21 which enters the central hole in the meter head, it cannot move in a straight line in a longitudinal direction, but must move also in a transverse direction, and thus a circular motion is imparted to the center of the meter-head, which causes the communications between the first-named pair of conduits 22 and the hole 13 and groove 14 respectively to be diminished, and communications to be opened and enlarged between said hole 13 and groove 14 and the other pair of said conduits 22, so that pressure liquid is now flowing from the hole 13 into both of the smaller ends of said conduits 22, and liquid is flowing from the smaller ends of the opposite conduits 22 to the groove 14. Part of the pressure liquid now flows through one of the other conduits 22 and imparts pressure in a transverse direction against one of the longitudinal walls of the meter-head, and, conversely, liquid from the opposite side of said meter-head flows inwardly through the spiral conduit 22 into the groove 14 and discharges outwardly. The meter-head is thus pressed in a transverse direction so that when liquid flows from the hole 13 through two adjacent short ends of the conduits, part of the flow of liquid has the effect of pushing the meter-head transversely, and part has the effect of pushing the slide frame longitudinally, in all cases, however, giving to the meter-head a circular motion of revolution about the shaft 18. It will be seen that in this way a constant rotation is imparted to said shaft. The long sides 7 of the slide piece 6 are cut away at top and bottom, as shown at 25, to reduce their height to less than that of the outer ends of the conduits 22, so that the liquid is in contact with the adjacent walls of the box 3.

Figure 5:
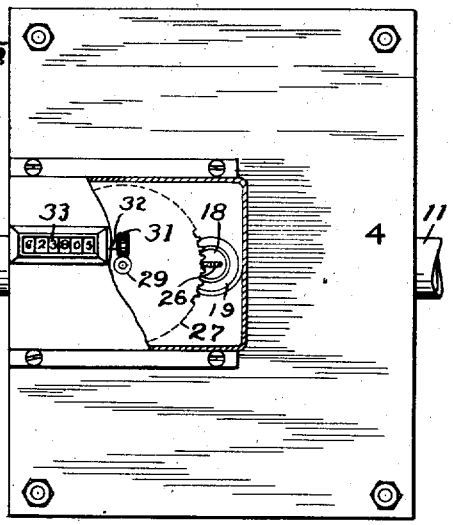
Fig. 5 is a broken plan view thereof.
Figure 3:
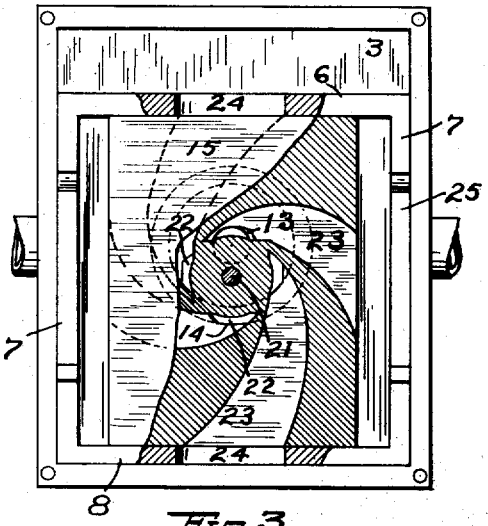
Fig. 3 is a view similar to Fig. 2 showing said parts in the same manner but in positions different from those in Fig. 2.
Figure 4:
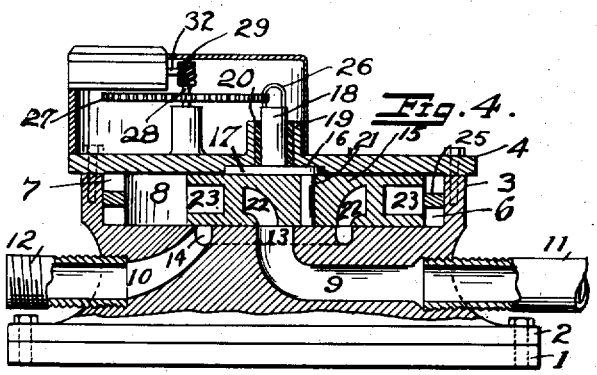
Fig. 4 is a transverse vertical section through the meter.

This motion of rotation of said shaft may be utilized in any manner to determine the rate of flow of the fluid in the meter. For instance, as shown in Fig. 5, the shaft 18 may carry a staple 26 which meshes with a gear wheel 27 upon a shaft 28 carrying also a spiral gear wheel 29 which meshes with a spiral gear wheel 31 on a shaft 32 which actuates mechanism 33 for registering the amount of liquid passed through the meter.

I claim:—

1. In a liquid meter, a rectangular casing, a rectangular slide piece slidable longitudinally in the casing and having walls, of which two opposite fit snugly against the adjacent walls of the casing and the others are spaced from the other walls thereof, a rectangular meter head slidable transversely in the slide piece and having conduits each opening at its inner end in the bottom of the meter head, and extending in an approximately spiral form through a quarter turn and opening at its outer end in a side of the meter head, the bottom of the casing having therein inlet and outlet conduits, their inner ends terminating respectively in a hole, and in a conduit spaced from said hole, in the bottom of the casing, inlet and outlet pipes connected with the outer ends of said inlet and outlet conduits respectively, a shaft extending through the top of the casing and operatively connected with said meter head to be turned thereby, and registering means operated by the rotation of said shaft.

2. In a liquid meter, a rectangular casing, a recessed top therefor, a rectangular slide piece slidable longitudinally in the casing and having walls, of which two opposite fit snugly against the adjacent walls of the casing and the others are spaced from the other walls thereof, a rectangular meter head slidable transversely in the slide piece and having conduits each opening at its inner end in the bottom of the meter head and extending in an approximately spiral form through a quarter turn and opening at its outer end in a side of the meter head, the bottom of the casing having therein inlet and outlet conduits, their inner ends terminating respectively in a hole, and in a conduit spaced from said hole, in the bottom of the casing, inlet and outlet pipes connected with the outer ends of said inlet and outlet conduits respectively, a disk in the recess in the top of the casing, a shaft extending through the top of the casing and connected to the center of the disk, a crank pin eccentrically secured to the disk and rotatably connected with said meter head, and registering means outside the casing, operated by the rotation of said shaft.

3. In combination, a casing having opposite and parallel walls, a slide piece having opposite and parallel walls slidable in said casing and forming a sliding joint with the opposite and parallel walls of said casing, a head having opposite and parallel walls slidable in said slide piece and forming a sliding joint with the opposite and parallel walls of said slide piece, and means for causing said head to move in a circle.

4. In combination, a casing having opposite and parallel walls, a slide piece having opposite and parallel walls slidable in said casing and forming a sliding joint with the opposite and parallel walls of said casing, a head having opposite and parallel walls slidable in said slide piece and forming a sliding joint with the opposite and parallel walls of said slide piece and having conduits extending from adjacent the center of the head and opening on the side walls of the head and on the bottom of the head adjacent the center, the casing being provided with an inlet conduit arranged to register successively with the inner ends of said conduits and an outlet conduit in the casing arranged to register successively with the inner ends of the conduits diametrically opposit the conduits in registry with the inlet conduit.

5. In combination, a casing, having opposite and parallel walls, a slide piece having opposite and parallel walls slidable in said casing and forming a sliding joint with the opposite and parallel walls of said casing, a head having opposite and parallel walls slidable in said slide piece and forming a sliding joint with the opposite and parallel walls of said slide piece and having conduits each opening at its inner end in the bottom of the head, and opening at its outer end in a side of the head, the bottom of the casing having therein inlet and outlet conduits adapted to register respectively and simultaneously with the diametrically disposed inner ends of two conduits.

6. In combination, a casing having opposite and parallel walls and having a liquid inlet conduit opening into the bottom of the casing and having a liquid outlet conduit opening into the bottom of said casing, a slide piece having parallel walls making sliding contact with the opposite and parallel walls of the casing, said slide piece being provided with other parallel walls, a head making sliding contact with said other parallel walls and provided with conduits adapted to communicate with the inlet and outlet conduits and opening on the sides of the head into said casing so that the passage of fluid through said casing causes a reciprocating movement of the slide piece in the casing, and a reciprocating movement of the head in the slide piece and means for controlling the movement of the head.

7. In combination, a casing, having opposite and parallel walls, a slide having opposite and parallel walls slidable in said casing in contact with the opposite and parallel walls thereof, the walls of said slide being provided with ports, a head slidable in said slide in contact with the opposite and parallel walls thereof, said head having conduits in continual communication with said ports, said casing having an inlet conduit and an outlet conduit opening into the slide chamber within the casing and adapted to register respectively and simultaneously with said conduits in said head whereby the flow of liquid through said inlet and outlet conduits causes a movement of the head with respect to the slide and a movement of the slide with respect to the casing, and means having a shaft arranged to move in a circle and bearing in said head to control the movement of the head with respect to the casing.

8. In combination, a chambered casing having a base, said base being provided with inlet and oulet conduits opening into the chamber, a slide frame in said casing and a head slidably arranged within the slide frame and provided with conduits adapted to register with said inlet and outlet conduits in the base.

9. In combination, a casing enclosing a chamber, a slide frame making sliding contact with opposite walls of said chamber and dividing said chamber into two cavities, a head arranged within said frame and making contact with the opposite walls thereof and dividing the space within said frame into two cavities, said latter opposite walls being provided with ports and said casing being provided with inlet and outlet ports, said head being provided with conduits adapted to register with said ports during the movement of the head and frame, said ports in said frame establishing communication between the cavities in the casing and said conduits.

10. In a liquid meter, a casing having inlet and outlet ports in its base and enclosing a chamber, a reciprocating frame arranged in said chamber dividing it into two compartments, a meter head dividing the chamber within the frame into two compartments, slidable in said frame in a direction at right angles to the reciprocation of the frame, said head being provided with conduits, each conduit opening at one end at one side of the head and at the other end, at the bottom of the head, said bottom opening being so disposed with relation to the inlet and outlet ports that liquid flowing through the inlet port is directed into the successive compartments, whereby the frame is reciprocated with respect to the casing and the head is reciprocated with respect to the frame, means for causing said head to move in a circle with relation to the casing and registering devices connected to said circularly moving head.

11. In combination, a chambered casing having a base provided with inlet and outlet conduits opening into the chamber, a slide frame in said chamber forming a sliding joint with opposite walls of the chamber, the free ends of the slide frame being provided with apertures to permit the passage of fluid from within the frame to the chamber within the casing and a head slidably arranged in said frame in sliding contact with the free ends thereof and being provided with conduits registering with said apertures and adapted to register respectively with said inlet and outlet conduits.

12. In combination, a chambered casing, having inlet and outlet conduits opening into said chamber, a slide frame in said chamber having two side walls in sliding contact with the sides of the casing and having end walls provided with apertures, a head arranged within the slide frame and making sliding contact with said end walls and having conduits opening on the sides thereof and having their inner ends disposed to register successively with said inlet and outlet conduits.

In testimony whereof, I have hereunto set my hand at San Francisco, California, this 24th day of March, 1919.

ALBERT J. GRANBERG.